US008643236B2

(12) United States Patent
Li et al.

(10) Patent No.: US 8,643,236 B2
(45) Date of Patent: Feb. 4, 2014

(54) MULTIFUNCTIONAL ELECTROMAGNETIC TRANSDUCER

(75) Inventors: Lin-zhen Li, Shenzhen (CN); Suo-He Wei, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 377 days.

(21) Appl. No.: 13/190,463

(22) Filed: Jul. 25, 2011

(65) Prior Publication Data

US 2012/0169152 A1 Jul. 5, 2012

(30) Foreign Application Priority Data

Jan. 5, 2011 (CN) .......................... 2011 1 0001021

(51) Int. Cl.
*H02K 7/06* (2006.01)

(52) U.S. Cl.
USPC ............................................... 310/81; 310/25

(58) Field of Classification Search
USPC ....................................... 310/25, 81; 381/412
See application file for complete search history.

(56) References Cited

U.S. PATENT DOCUMENTS

| | | | | |
|---|---|---|---|---|
| 5,546,069 | A * | 8/1996 | Holden et al. | 340/407.1 |
| 5,903,076 | A * | 5/1999 | Suyama | 310/81 |
| 7,161,269 | B2 * | 1/2007 | Kayama et al. | 310/81 |
| 7,538,463 | B2 * | 5/2009 | Miura et al. | 310/81 |
| 2005/0285454 | A1 * | 12/2005 | Choi et al. | 310/14 |
| 2006/0028077 | A1 * | 2/2006 | Yamaguchi et al. | 310/81 |
| 2006/0082231 | A1 * | 4/2006 | Kayama et al. | 310/81 |
| 2012/0170792 | A1 * | 7/2012 | Li et al. | 381/412 |

* cited by examiner

*Primary Examiner* — Thanh Lam
(74) *Attorney, Agent, or Firm* — Anova Law Group, PLLC

(57) ABSTRACT

A multifunctional electromagnetic transducer includes a bracket, a vibrating unit including a magnetic circuit part receiving in the bracket, and a plurality of elastic members assembled to the bracket for sustaining the magnetic circuit part. The magnetic circuit part defines a pole plate, a first magnet disposed at a center portion of the pole plate, and a plurality of second magnets surrounding the first magnet and forming a magnetic gap corporately with the first magnet. Each of the second magnets forms a receiving gap corporately with an adjacent second magnet. Each of the receiving gap receives a weight therein. A voice coil is partially inserted into the magnetic gap.

19 Claims, 5 Drawing Sheets

10
16
150
15
151
14
19a
13
134
131b
131a
134
11
110
12

MULTIFUNCTIONAL ELECTROMAGNETIC TRANSDUCER

FIELD OF THE INVENTION

The present invention relates to an electromagnetic transducer, and more particularly to an multifunctional electromagnetic transducer with multiple magnets.

DESCRIPTION OF RELATED ART

With the rapid development of the portable devices such as cellular phones, people request for more and more functions. In the field of music enjoying of the cellular phone, a multifunction device enabling providing both audible and tactile sensations for amusement has already been widely used, which boosts the quick development of multifunctional devices.

An electromagnetic transducer related to the present invention comprises a bracket, a magnetic circuit part received in the bracket, and an assistant part connecting to the bracket. The magnetic circuit part includes a single magnet and a single magnetic frame corporately forming a magnetic circuit. The magnetic frame is assembled with the assistant part so that the magnetic circuit part is suspended in the bracket by the assistant part. Elastic members are generally used as a part of the assistant part, and the magnetic circuit part could vibrate in the corresponding range of frequencies actuating by the elastic deformation of the elastic members. However, said magnetic circuit part has a low weight and weak magnetism, which couldn't satisfy users' demands for greater vibrating amplitude.

Therefore, it is necessary to provide a new multifunctional electromagnetic transducer for solving the problems mentioned above.

DETAILED DESCRIPTION OF THE EMBODIMENT

Reference will now be made to describe the exemplary embodiment of the present invention in detail.

Figure 1:
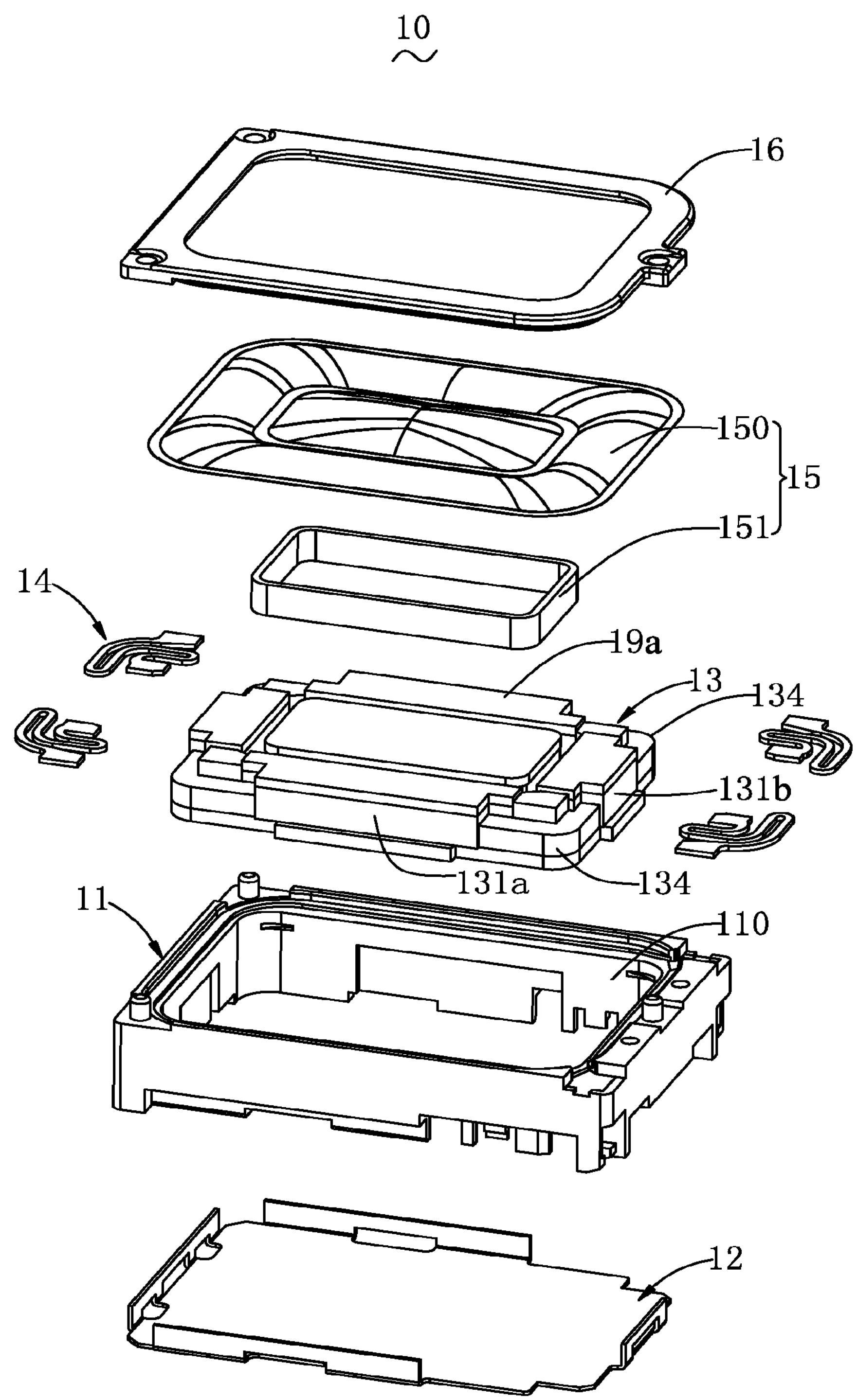
FIG. 1 is an isometric exploded view of a multifunctional electromagnetic transducer in accordance with an exemplary embodiment of the present disclosure.
Figure 2:
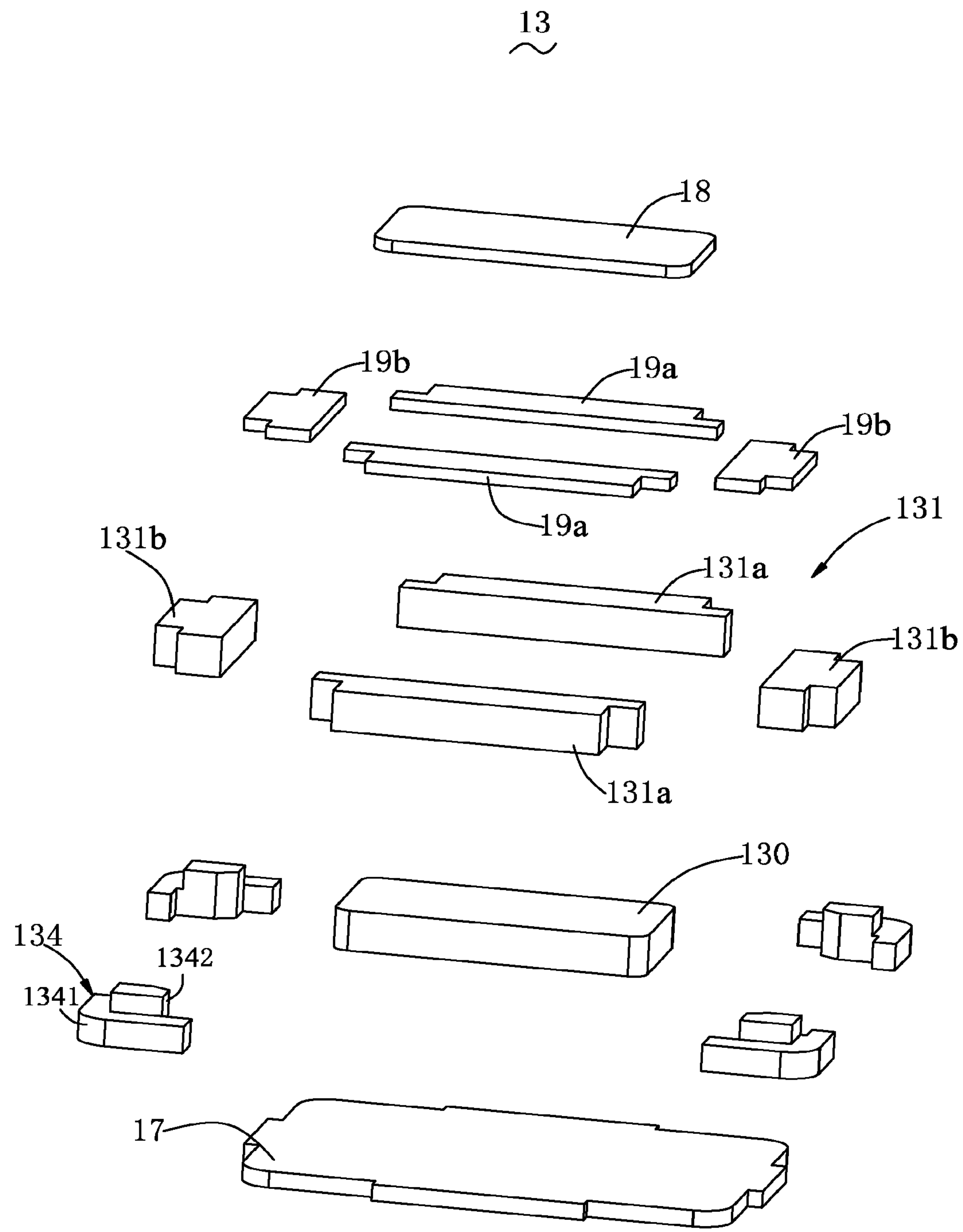
FIG. 2 is an exploded view of a magnetic circuit part of the multifunctional electromagnetic transducer shown in FIG. 1.
Figure 3:
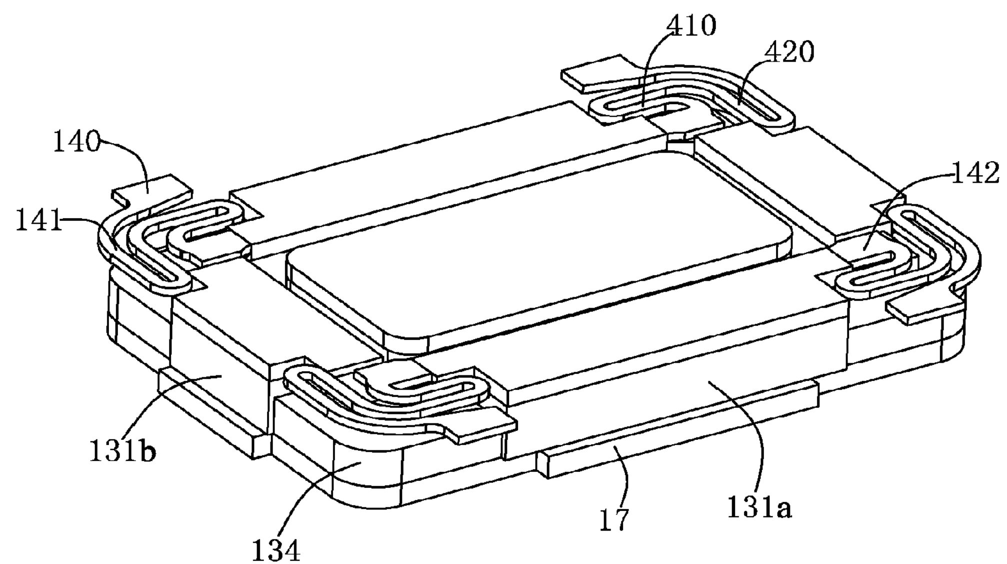
FIG. 3 is a combination of an assistant part and the magnetic circuit part of the multifunctional electromagnetic transducer shown in FIG. 1.
Figure 4:
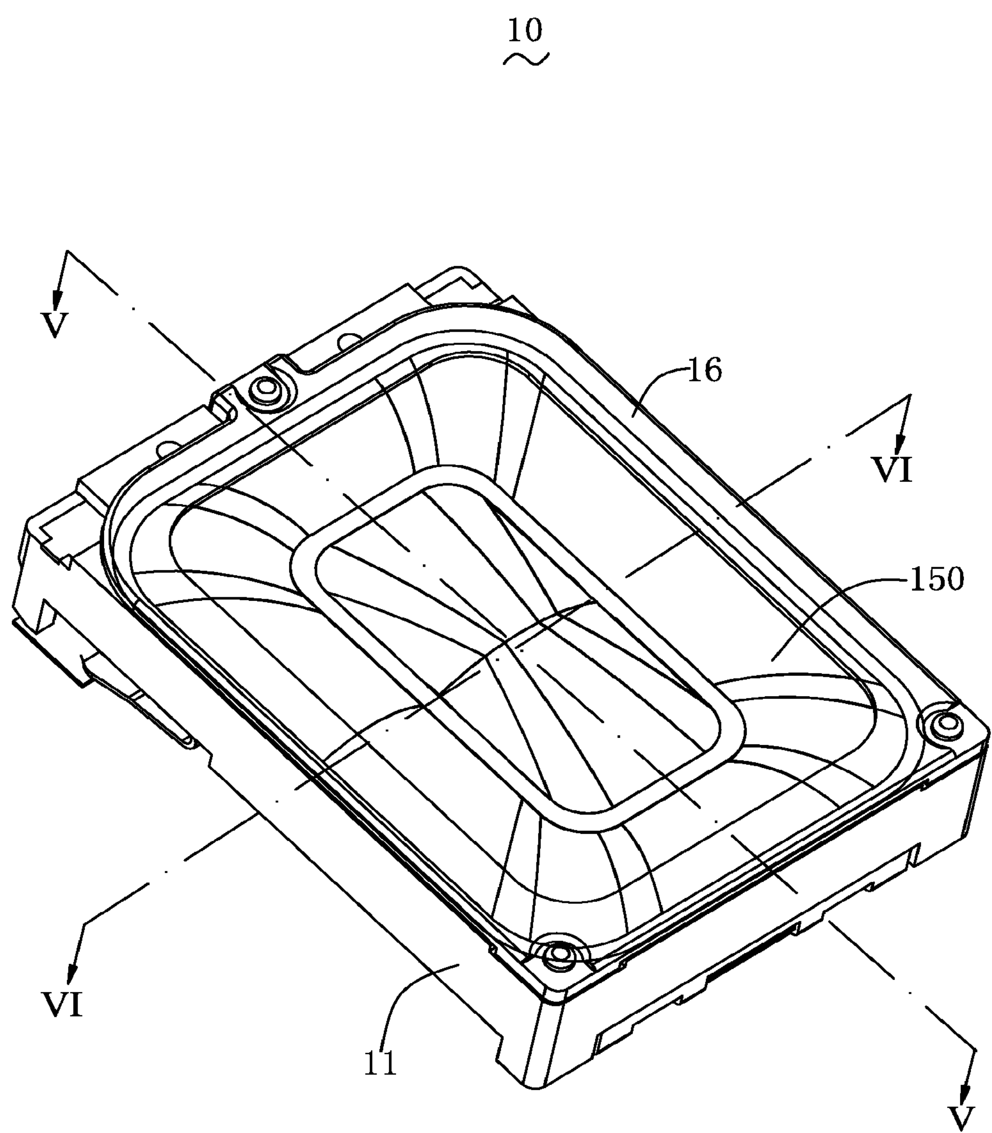
FIG. 4 is an isometric assembled view of the multifunctional electromagnetic transducer shown in FIG. 1.

Referring to FIGS. 1 to 2, a multifunctional electromagnetic transducer 10 comprises a bracket 11 including an inner face 110, a lower cover 12 assembled with the bracket 11, a magnetic circuit part 13 suspended in the bracket 11, an assistant part 14 including a first end attached to the magnetic circuit part 13 and a second end assembled to the inner face 110 of the bracket 11, an voice generating part 15 actuated by the magnetic circuit part 13, and an upper cover 16 protecting the voice generating part 15. The voice generating part 15 comprises a diaphragm 150 supported by the bracket 11, and a voice coil 151 connected with a lower surface of the diaphragm 150 and actuated by the magnetic field of the magnetic circuit part 13. The upper cover 16 is joined with the periphery of the diaphragm 150. The multifunctional electromagnetic transducer 10 enables generating both sound and vibration.

Referring especially to FIG. 2, the magnetic circuit part 13 includes a pole plate 17, a first magnet 130 positioned at a central portion of the pole plate 17, a plurality of second magnets 131 positioned at a periphery portion of the pole plate 17 and surrounding the first magnet 130. In the embodiment, four second magnets 131 are provided surrounding the first magnet 130, and include a pair of longer magnets 131*a* respectively opposed to a longer end of the first magnet 130 and a pair of shorter magnets 131*b* respectively opposed to a shorter end of the first magnet 130. Each of the second magnets 131 forms a receiving gap corporately with an adjacent second magnet 131. Each of the receiving gaps receives a weight 134 therein. A magnetic gap 137 is formed between the first magnet 130 and the second magnets 131 for partially receiving the voice coil 151 (referring to FIG. 5 and FIG. 6). The combination of the pole plate 17, the first magnet 130, the second magnets 131, and the weights 134 serves as a vibrating unit. Each of the first and second magnets 130,131 is provided with an upper plate 18, 19*a*, 19*b* attached to top surfaces thereof.

Each weight 134 defines a L-shaped first segment 1341, a second segment 1342 disposed at a inner corner of the first segment 1341 and defining an top face higher than the upmost face of the first segment 1341. The weights 134 are fixed on the pole plate 17.

Figure 5:
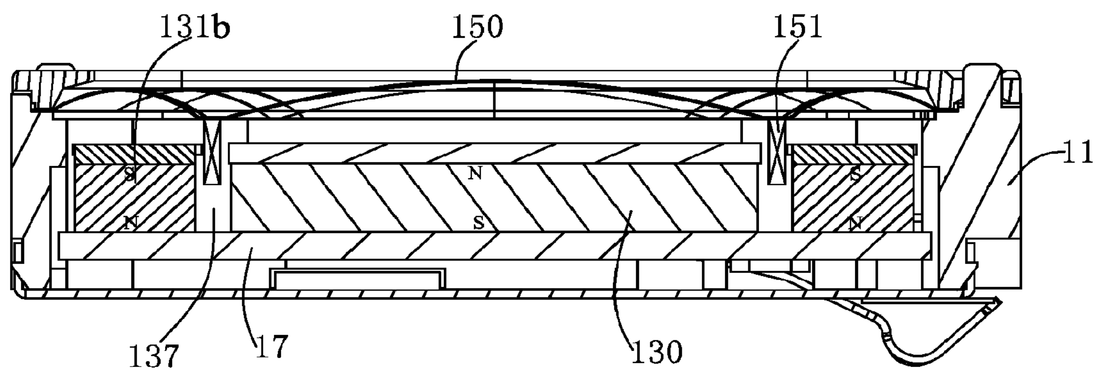
FIG. 5 is a cross-sectional view of the multifunctional electromagnetic transducer taken along line V-V in FIG. 4.
Figure 6:
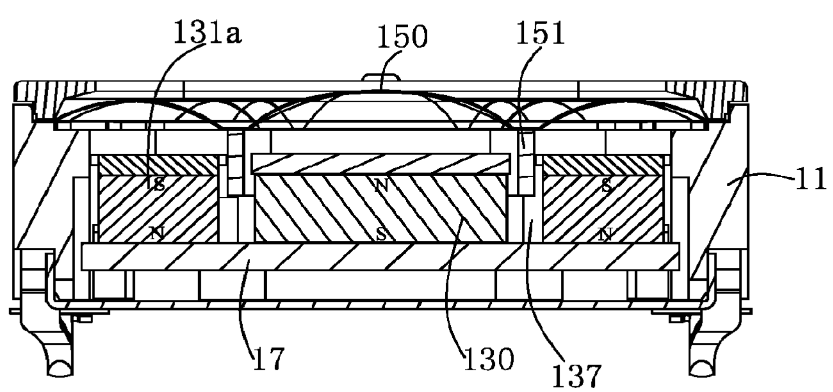
FIG. 6 is a cross-sectional view of the multifunctional electromagnetic transducer taken along line VI-VI in FIG. 4.

Referring to FIGS. 5 to 6, the direction of the magnetic pole of the first magnet 130 is reverse to the direction of the magnetic pole of the second magnet 131. In the present exemplary embodiment, the lower face of the first magnet 130 is defined as South Pole, and the upper face of the first magnet 130 is defined as North Pole. At the same time, the lower face of each second magnet 131 is defined as North Pole, and the upper face of the second magnet 131 is defined as South Pole. Therefore, the first magnet 130 and the four second magnets 131 are forming a magnetic circuit with high magnetic flux density for actuating the voice coil 151 supplied with currents to drive the diaphragm 151. And the high magnetic flux density could make the voice generating part 15 more sensitive and increase the vibrating amplitude of the vibrating unit.

Referring to FIG. 6, in the present exemplary embodiment, the assistant part 14 includes four elastic members. Each of the elastic member defines a retaining portion 140 assembling to the bracket 11, a connecting portion 142 attached to the vibrating unit, and an elastic portion 141 extending from the retaining portion 140 to the connecting portion 142 along a devious way. The connecting portion 142 is retained on the vibrating unit by soldering or adhesive.

The elastic members are positioned above the weights 134 of the vibrating unit. Each of the elastic portions 141 of the elastic members defines a U-shaped first arm 410 roughly extending lengthways and a U-shaped second arm 420 roughly extending transversely. The first arm 410 improves elasticity along the transverse direction and the second arm 420 improves elasticity along the longitudinal direction, which protects the multifunctional electromagnetic transducer 10 from being damaged during falling off.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A multifunctional electromagnetic transducer, comprising:

a bracket;

a vibrating unit including a magnetic circuit part receiving in the bracket, the magnetic circuit part defining a pole plate, a first magnet disposed at a center portion of the pole plate, and a plurality of second magnets surrounding the first magnet and forming a magnetic gap corporately with the first magnet, each of the second magnets forming a receiving gap corporately with an adjacent second magnet, each of the receiving gap receiving a weight therein;

a plurality of elastic members assembled to the bracket for suspending the magnetic circuit part in the bracket;

a voice coil partially inserted into the magnetic gap.

2. The multifunctional electromagnetic transducer as described in claim 1, wherein the vibrating unit includes four second magnets.

3. The multifunctional electromagnetic transducer as described in claim 2, wherein the first magnet has a configuration of rectangular block, the four second magnets respectively surrounding four side faces of the first magnet.

4. The multifunctional electromagnetic transducer as described in claim 3, wherein the direction of the magnetic pole of the first magnet is reverse to the direction of the magnetic pole of the second magnets.

5. The multifunctional electromagnetic transducer as described in claim 4, wherein each of the first and second magnets is provided with an upper plate attached to top surfaces thereof.

6. The multifunctional electromagnetic transducer as described in claim 1, wherein, each of the elastic members is attached to a top surface of a corresponding weight.

7. The multifunctional electromagnetic transducer as described in claim 6, wherein each of the elastic members includes a retaining portion attached to an inner face of the bracket, a connecting portion attached to the vibrating unit, and an elastic portion extending from the retaining portion to the connecting portion along a devious way.

8. A multifunctional electromagnetic transducer, comprising:

a bracket;

a vibrating unit including a magnetic circuit part suspended in the bracket, the magnetic circuit part defining a pole plate, a first magnet positioned at a center of the pole plate, and a plurality of second magnets positioned at a periphery of the pole plate and forming a magnetic gap corporately with the first magnet, the direction of the magnetic pole of the first magnet is reverse to the direction of the magnetic pole of the second magnets;

a plurality of elastic members assembled to the bracket and sustaining the magnetic circuit part;

a diaphragm shielding supported by the bracket;

a voice coil attached to the diaphragm and partly inserted into the magnetic gap.

9. The multifunctional electromagnetic transducer as described in claim 8, wherein four second magnets are provided for surrounding the first magnet.

10. The multifunctional electromagnetic transducer as described in claim 9, wherein the first magnet has a configuration of rectangular block, the four second magnets respectively surrounding four side faces of the first magnet.

11. The multifunctional electromagnetic transducer as described in claim 10, wherein the four second magnets include a pair of longer magnets respectively opposed to a longer end of the first magnet and a pair of shorter magnets respectively opposed to a shorter end of the first magnet.

12. The multifunctional electromagnetic transducer as described in claim 11, wherein each of the second magnets forms a receiving gap corporately with an adjacent second magnet, each of the receiving gap receiving a weight therein.

13. The multifunctional electromagnetic transducer as described in claim 12, wherein the weights are positioned on the pole plate.

14. The multifunctional electromagnetic transducer as described in claim 13, wherein each of the first and second magnets is provided with an upper plate attached to top surfaces thereof.

15. The multifunctional electromagnetic transducer as described in claim 14, wherein, the elastic members are positioned above the weights.

16. The multifunctional electromagnetic transducer as described in claim 15, wherein each of the elastic members includes a retaining portion attached to an inner face of the bracket, a connecting portion attached to the magnetic circuit part, and an elastic portion extending from the retaining portion to the connecting portion along a devious way.

17. A multifunctional electromagnetic transducer, comprising:

a bracket with an inner face;

a vibrating unit including a magnetic circuit part accommodated in the bracket, the magnetic circuit part including a pole plate, a plurality of magnets disposed on the pole plate and a plurality of upper plates disposed on top faces of the magnets, the plurality of magnets forming a magnetic gap and a plurality of receiving gaps;

a plurality of weights receiving in the receiving gaps;

a plurality of elastic members elastically supporting the magnetic circuit part in the bracket, each of the elastic members defining a first end attached to the inner face of the magnetic circuit part and a second end attached to the vibrating unit;

a diaphragm supported by the bracket;

a voice coil attached to the diaphragm and partially inserted into the magnetic gap.

18. The electromagnetic transducer as described in claim 17, wherein the magnetic circuit part includes a first magnet disposed at a center portion of the pole plate and four second magnets disposed at a periphery portion of the pole plate and surrounding the first magnet, the direction of the magnetic pole of the first magnet is reverse to the direction of the magnetic pole of the second magnets.

19. The electromagnetic transducer as described in claim 17, wherein the elastic members are positioned above the weights.

* * * * *